United States Patent
Dede et al.

(10) Patent No.: US 10,098,065 B2
(45) Date of Patent: Oct. 9, 2018

(54) POWER SAVING VIA PHY FIRMWARE ISLAND

(71) Applicant: QUALCOMM Incorporated, San Diego, CA (US)

(72) Inventors: Erdogan Dede, San Diego, CA (US); Vijaya Chandran Ramasami, San Diego, CA (US); Arunava Chaudhuri, San Diego, CA (US); Jun Ni, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/438,188

(22) Filed: Feb. 21, 2017

(65) Prior Publication Data

US 2018/0242245 A1    Aug. 23, 2018

(51) Int. Cl.
| | |
|---|---|
| *H04W 52/02* | (2009.01) |
| *H04W 76/28* | (2018.01) |
| *H04W 24/08* | (2009.01) |
| *H04W 76/00* | (2018.01) |
| *H04W 76/04* | (2009.01) |

(52) U.S. Cl.
CPC ....... *H04W 52/0225* (2013.01); *H04W 24/08* (2013.01); *H04W 76/048* (2013.01); *H04W 76/28* (2018.02)

(58) Field of Classification Search
CPC ... H04W 52/0225; H04W 76/28; H04W 4/08; H04W 76/048; G11C 7/10; G11C 5/14; G11C 5/148; G06F 1/32; G06F 11/14; G06F 1/3287; G06F 11/1417; Y02D 10/171; Y02B 60/1282

See application file for complete search history.

(56) References Cited

U.S. PATENT DOCUMENTS

| | | | |
|---|---|---|---|
| 8,788,655 B2 * | 7/2014 | Dare ........................ | G06F 8/61 370/352 |
| 8,838,188 B1 | 9/2014 | Pan | |

(Continued)

OTHER PUBLICATIONS

International Search Report and Written Opinion—PCT/US2018/014341—ISA/EPO—dated Jun. 15, 2018.

*Primary Examiner* — Pablo Tran
(74) *Attorney, Agent, or Firm* — Patterson & Sheridan, LLP (57) ABSTRACT

Aspects provide techniques and apparatus for wireless communications (e.g., for saving power when performing control channel processing when in an idle mode or in a "PDCCH only" in connected mode). An exemplary method includes performing, using a processor, a first type of control channel processing in a first connection state using a firmware image stored in internal memory of the processor, wherein performing control channel processing comprises accessing memory external to the processor, determining one or more conditions for entering a low-power mode (LPM) associated with the processor are satisfied, entering the LPM based on the determination, wherein entering into the LPM includes at least one of disabling or disallowing access to the external memory based on entering the LPM, and performing, using the processor, a second type of control channel processing using the firmware image stored in internal memory of the processor based on entering the LPM.

30 Claims, 4 Drawing Sheets

(56) References Cited

U.S. PATENT DOCUMENTS

| | | | |
|---|---|---|---|
| 8,856,366 B2* | 10/2014 | Park | G06F 1/3203 |
| | | | 709/229 |
| 9,119,153 B2 | 8/2015 | Deivasigamani et al. | |
| 9,244,675 B2* | 1/2016 | Tsuji | G06F 8/665 |
| 9,530,461 B2* | 12/2016 | Akers | G06F 1/3287 |
| 2005/0064829 A1 | 3/2005 | Kang et al. | |
| 2009/0292934 A1 | 11/2009 | Esliger | |
| 2014/0119256 A1 | 5/2014 | Kim | |
| 2014/0164725 A1* | 6/2014 | Jang | G06F 21/575 |
| | | | 711/163 |
| 2014/0289314 A1* | 9/2014 | Dare | G06F 8/61 |
| | | | 709/203 |
| 2016/0041606 A1* | 2/2016 | Andrews | G06F 1/3296 |
| | | | 713/320 |
| 2016/0128128 A1 | 5/2016 | Ang et al. | |
| 2017/0168747 A1* | 6/2017 | Han | G06F 3/0632 |
| 2017/0212750 A1* | 7/2017 | Stutzenberger | G06F 8/654 |
| 2017/0277897 A1* | 9/2017 | Jang | G06F 21/575 |

* cited by examiner

POWER SAVING VIA PHY FIRMWARE ISLAND

FIELD OF THE DISCLOSURE

Certain aspects of the present disclosure generally relate to wireless communications and, more particularly, to power saving (e.g., via a physical (PHY) layer firmware island in a processor).

DESCRIPTION OF RELATED ART

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

Power is inefficiently used by a user equipment (UE) for wireless communications. Improved methods and apparatus for UE power consumption are desired.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure generally relate to wireless communications and, more particularly, to power saving (e.g., via a physical (PHY) layer firmware island in a processor).

Aspects of the present disclosure provide a method for wireless communications by an apparatus. The method generally includes performing, using a processor, a first type of control channel processing in a first connection state using a firmware image stored in internal memory of the processor, wherein performing control channel processing comprises accessing memory external to the processor, determining one or more conditions for entering a low-power mode associated with the processor are satisfied, entering the low-power mode based on the determination, wherein entering into the low-power mode includes at least one of disabling or disallowing access to the memory external to the processor based on entering the low-power mode, and performing, using the processor, a second type of control channel processing using the firmware image stored in internal memory of the processor based on entering the low-power mode.

Aspects of the present disclosure provide an apparatus for wireless communications. The apparatus generally includes a processor configured to perform a first type of control channel processing in a first connection state using a firmware image stored in internal memory of the processor, wherein performing control channel processing comprises accessing memory external to the processor, determine one or more conditions for entering a low-power mode associated with the processor are satisfied, enter the low-power mode based on the determination, wherein entering into the low-power mode includes at least one of disabling or disallowing access to the memory external to the processor based on entering the low-power mode, and perform a second type of control channel processing using the firmware image stored in internal memory of the processor based on entering the low-power mode.

Aspects of the present disclosure provide a non-transitory computer-readable medium for wireless communications by an apparatus. The non-transitory computer-readable medium comprises instructions that when executed by a processor configure the processor to perform a first type of control channel processing in a first connection state using a firmware image stored in internal memory of the processor, wherein performing control channel processing comprises accessing memory external to the processor, determine one or more conditions for entering a low-power mode associated with the processor are satisfied, enter the low-power mode based on the determination, wherein entering into the low-power mode includes at least one of disabling or disallowing access to the memory external to the processor based on entering the low-power mode, and perform, using the processor, a second type of control channel processing using the firmware image stored in internal memory of the processor based on entering the low-power mode.

Aspects of the present disclosure provide an apparatus for wireless communications performed by a user equipment (UE). The apparatus generally includes means for performing a first type of control channel processing in a first connection state using a firmware image stored in internal memory, wherein the means for performing the first type of control channel processing are configured to access external memory during the first type of control channel processing, means for determining one or more conditions for entering a low-power mode associated with the means for performing the first type of control channel processing are satisfied, means for entering the low-power mode based on the determination, wherein the means for entering the low-power mode are configured to at least one of disable or disallow access to the external memory while in the low-power mode, and means for performing a second type of control channel processing using the firmware image stored in the internal memory while in the low-power mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Wireless products (e.g., user equipments (UEs)) employ full LTE receiver capability when dealing with idle mode and physical downlink control channel (PDCCH)-only functionality. However, in some cases, full LTE receiver capability may not be needed, which may lead to an unnecessary waste of power resources at the UE. Aspects of the present disclosure propose techniques for saving power at the UE when the UE is operating in idle mode and/or "PDCCH only" in connected mode.

In some cases, reducing the power consumption at the UE when in idle mode (e.g., idle mode DRX) or in "PDCCH only" in connected mode may involve the use of a power-efficient island within the physical (PHY) firmware (FW) domain on a DSP processor in the UE that deals with DRX functionality and operates at the reduced or lowest clock and/or voltage levels possible. For example, in some cases, when the UE is in idle mode or "PDCCH only" in connected mode, the UE may enter a low-power mode (e.g., "island mode") based on certain entry conditions. The low-power mode may require that the UE place memory external to the DSP into a zero-power mode and instead rely on (e.g., only on) memory internal to the DSP (e.g., tightly coupled memory (TCM), cache memory and/or main memory) when performing control channel processing (e.g., processing of a physical downlink control channel (PDCCH)).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Orthogonal Frequency Division Multiplexing (OFDM) networks, Time Division Multiple Access (TDMA) networks, Frequency Division Multiple Access (FDMA) networks, Orthogonal FDMA (OFDMA) networks, Single-Carrier FDMA (SC-FDMA) networks, Code Division Multiple Access (CDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16 (e.g., WiMAX (Worldwide Interoperability for Microwave Access)), IEEE 802.20, Flash-OFDM®, etc. UTRA, E-UTRA, and GSM are part of Universal Mobile Telecommunication System (UMTS). Long Term Evolution (LTE) and Long Term Evolution Advanced (LTE-A) are upcoming releases of UMTS that use E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). CDMA2000 is described in documents from an organization named "3rd Generation Partnership Project 2" (3GPP2). These various radio technologies and standards are known in the art. For clarity, certain aspects of the techniques are described below for LTE and LTE-A.

The teachings herein may be incorporated into (e.g., implemented within or performed by) a variety of wired or wireless apparatuses (e.g., nodes). In some aspects a node comprises a wireless node. Such wireless node may provide, for example, connectivity for or to a network (e.g., a wide area network such as the Internet or a cellular network) via a wired or wireless communication link. In some aspects, a wireless node implemented in accordance with the teachings herein may comprise an access point or an access terminal.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology. In some implementations an access point may comprise a set top box kiosk, a media center, or any other suitable device that is configured to communicate via a wireless or wired medium.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), a tablet, an entertainment device (e.g., a music or video device, or a satellite radio), a television display, a flip-cam, a security video camera, a digital video recorder (DVR), a global positioning system device, a sensor/industrial equipment, a medical device, an automobile/vehicle, a human implantable device, wearables, or any other suitable device that is configured to communicate via a wireless or wired medium.

Figure 1:
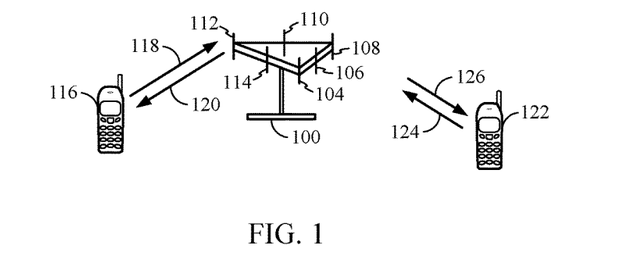
FIG. 1 illustrates a diagram of an example wireless communications network, in accordance with certain aspects of the present disclosure.

FIG. 1 illustrates a wireless communications system in which aspects of the disclosure may be performed. For example, in some cases, when operating in an idle mode or "PDCCH only" in connected mode, a user terminal 116 may be configured to enter a low-power "island" mode associated with its processor based on one or more entry conditions. According to aspects, when operating in the low-power mode, access to memory external to the processor may be disallowed and/or disabled.

Referring to FIG. 1, a multiple access wireless communication system according to one aspect is illustrated. In an aspect of the present disclosure, the wireless communication system from FIG. 1 may be a wireless mobile broadband system based on Orthogonal Frequency Division Multiplexing (OFDM). An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

Figure 2:
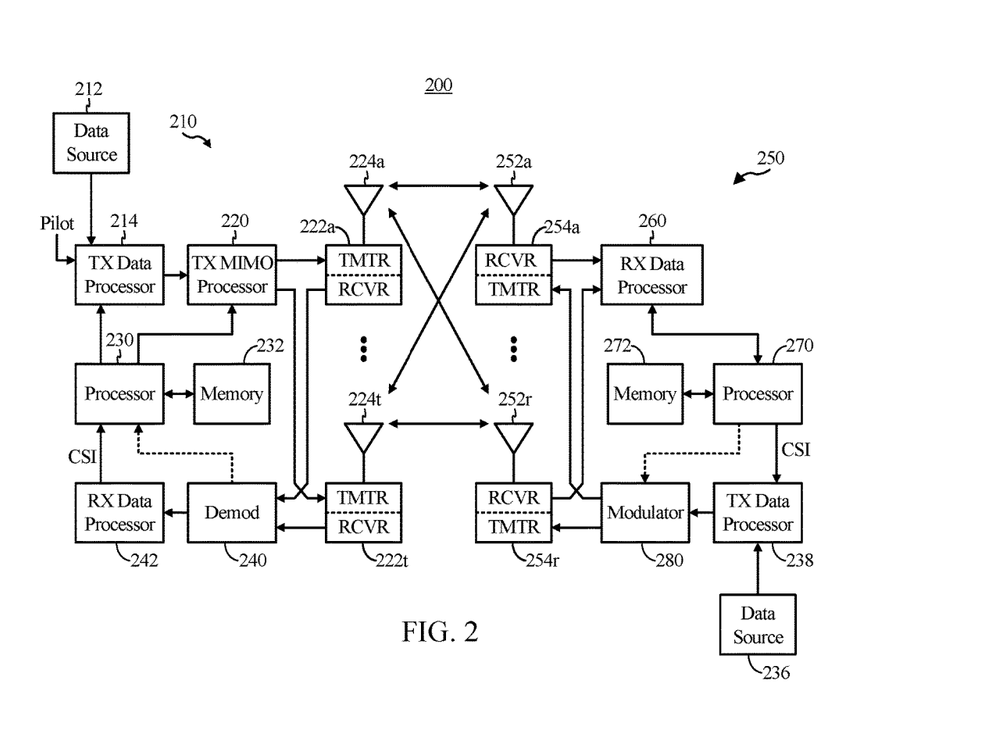
FIG. 2 illustrates a block diagram of an example access point and a user terminal, in accordance with certain aspects of the present disclosure.

FIG. 2 illustrates a block diagram of an aspect of a transmitter system 210 (e.g., also known as the access point (e.g., access point 100) and a receiver system 250 (e.g., also known as the access terminal (e.g., access terminal 116)) in a wireless communications system, for example, a MIMO system 200. According to aspects, receiver system 250 is an example of a device that may be configured to implement the various methods described herein. For example, the receiver system 250 may implement operations 400 illustrated in FIG. 4.

At the transmitter system 210, traffic data for a number of data streams is provided from a data source 212 to a transmit (TX) data processor 214. In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, m-QPSK, or m-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

Figure 3:
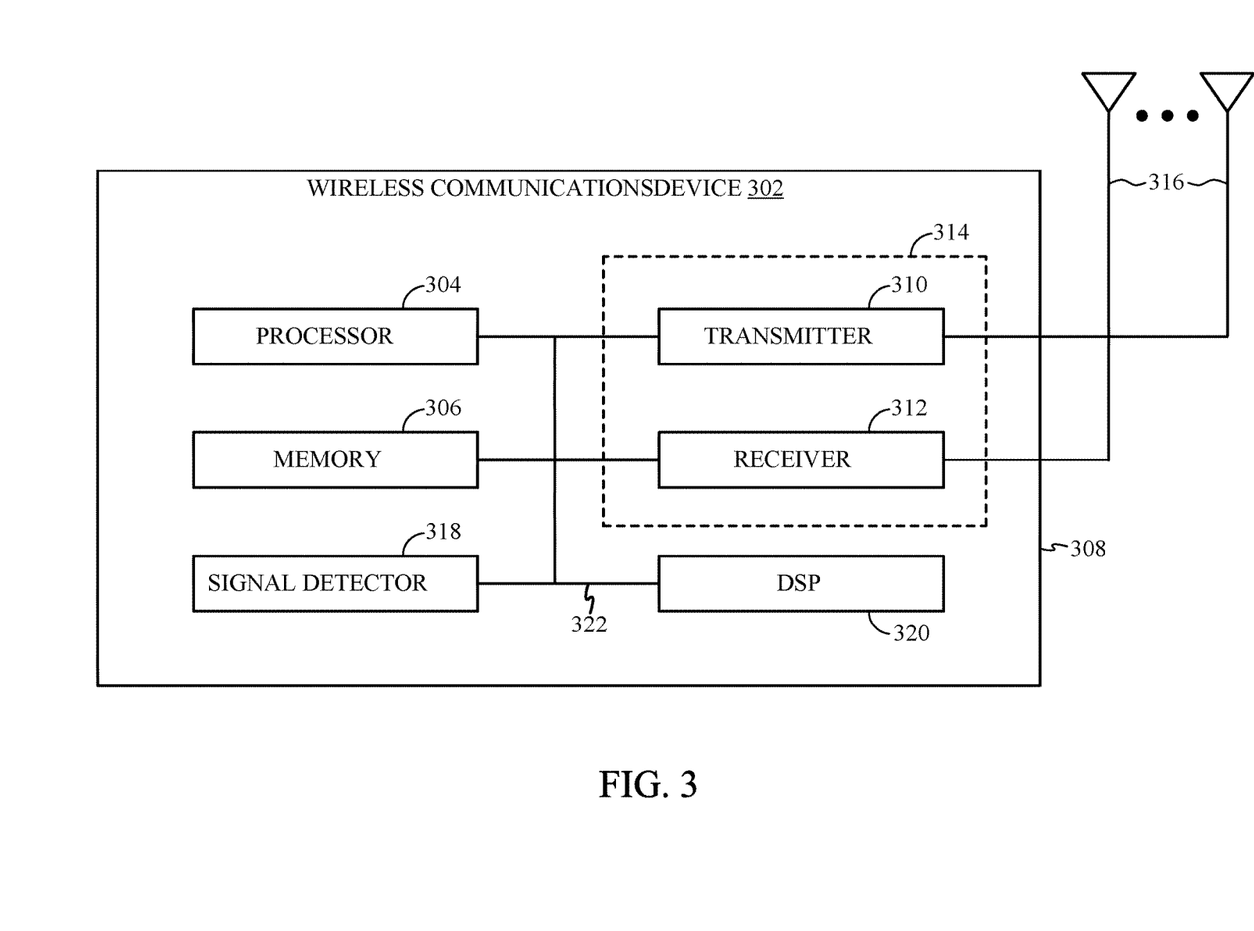
FIG. 3 illustrates a block diagram of an example wireless device, in accordance with certain aspects of the present disclosure.

FIG. 3 illustrates various components that may be utilized in a wireless communications device 302 that may be employed within the MIMO system 100. The wireless communications device 302 is an example of a device that may be configured to implement the various methods described herein. For example, the wireless communications device 302 may implement operations 400 illustrated in FIG. 4. The wireless device 302 may be an access point 100 or an access terminal 116.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals (e.g., control channel processing). In some cases, the DSP processor 320 may be configured to enter a low-power "island" mode based on certain entry conditions. When operating in the low-power mode, access to memory external to the DSP 320 may be disabled and/or disallowed, and the DSP 320 may instead rely on (e.g., rely only on) internal memory to perform control channel processing, for example, as described in greater detail below. A more detailed illustration of the components in the DSP 320 is presented in FIG. 5.

The various components of the wireless device 302 may be coupled together by a bus system 322, which may include a power bus, a control signal bus, and a status signal bus in addition to a data bus.

As described above, one or more modules may be configured to perform the operations and recited and described herein. For example, one or more of the Tx/Rx 222, 254, antenna 224, 252, controller 230, 280, channel estimator 228, 278, scheduler 234, and memory 232, 282 illustrated in FIG. 2 and/or the processor 304, memory 306, signal detector 318, transmitter 310, receiver 312, DSP 320 and/or antenna 316 illustrated in FIG. 3 may, alone or in combination, perform the operations recited herein (e.g., operations 400 illustrated in FIG. 4).

Example Power Saving Via PHY Firmware Island

In LTE, a user equipment (UE) may operate under various modes when connected to the network, such as an idle mode and a connected mode. The radio resource control (RRC) idle mode is used when the eNodeB and/or UE do not have any data to transmit. Idle mode impacts the standby time of the UE. In idle mode, the UE performs searches, measurements, PBCH decoding, and monitoring SIB1. The UE also decodes the physical downlink control channel (PDCCH) per every paging cycle. On receiving a page meant for the UE or when the UE has uplink data to transmit, it initiates a random access channel (RACH) procedure to connect to its serving cell and transitions to the radio resource control (RRC) connected state.

The RRC connected state also includes the radio resource control (RRC) connected mode and the RRC connected mode DRX (discontinuous reception). The RRC connected mode is the mode in which the UE is receiving data. In this mode, the UE monitors subframes, performs mobility procedures, etc. The UE may be requested to transition to idle mode if the eNodeB does not expect any data transmission for the UE. In RRC connected mode, a UE may operate in a PDCCH only mode, which is a power saving mode within the connected mode. In this mode, the UE monitors PDCCH only on a subset of subframes and switches to RRC connected mode upon receiving a PDCCH corresponding to PDSCH/PUSCH.

Whether the UE is in idle mode or "PDCCH only" in Connected mode, the UE will be in a DRX mode. In such modes, the UE will only enable receiving during a paging occasion and perform light loaded receive functionality until it decodes the page, for example, as opposed to the heavy-loaded receive functionality after page is decoded.

Wireless products utilize full LTE receiver capability when dealing with the DRX and PDCCH only functionality. However, in some cases, full LTE receiver capability may not be needed, which may lead to an unnecessary waste of power resources at the UE. Accordingly, aspects of the present disclosure propose techniques and apparatus for saving power at the UE when the UE is operating in idle mode and/or "PDCCH only" in connected mode.

In some cases, reducing the power consumption at the UE when in idle mode or in "PDCCH only" in connected mode may involve the use of a power-efficient island within the physical (PHY) firmware (FW) domain on a DSP processor (e.g., DSP 320) that deals with DRX functionality and operates at the lowest clock and voltage levels possible. For example, in some cases, when the UE is in idle mode or "PDCCH only" in connected mode, the UE may enter a low-power mode (e.g., "island mode") based on certain entry conditions. The low-power mode may require that the UE place memory external to the DSP into a zero-power mode and instead rely only on memory internal to the DSP (e.g., tightly coupled memory (TCM), cache memory, and/or main memory) when performing control channel processing (e.g., processing of a physical downlink control channel (PDCCH)).

Figure 4:
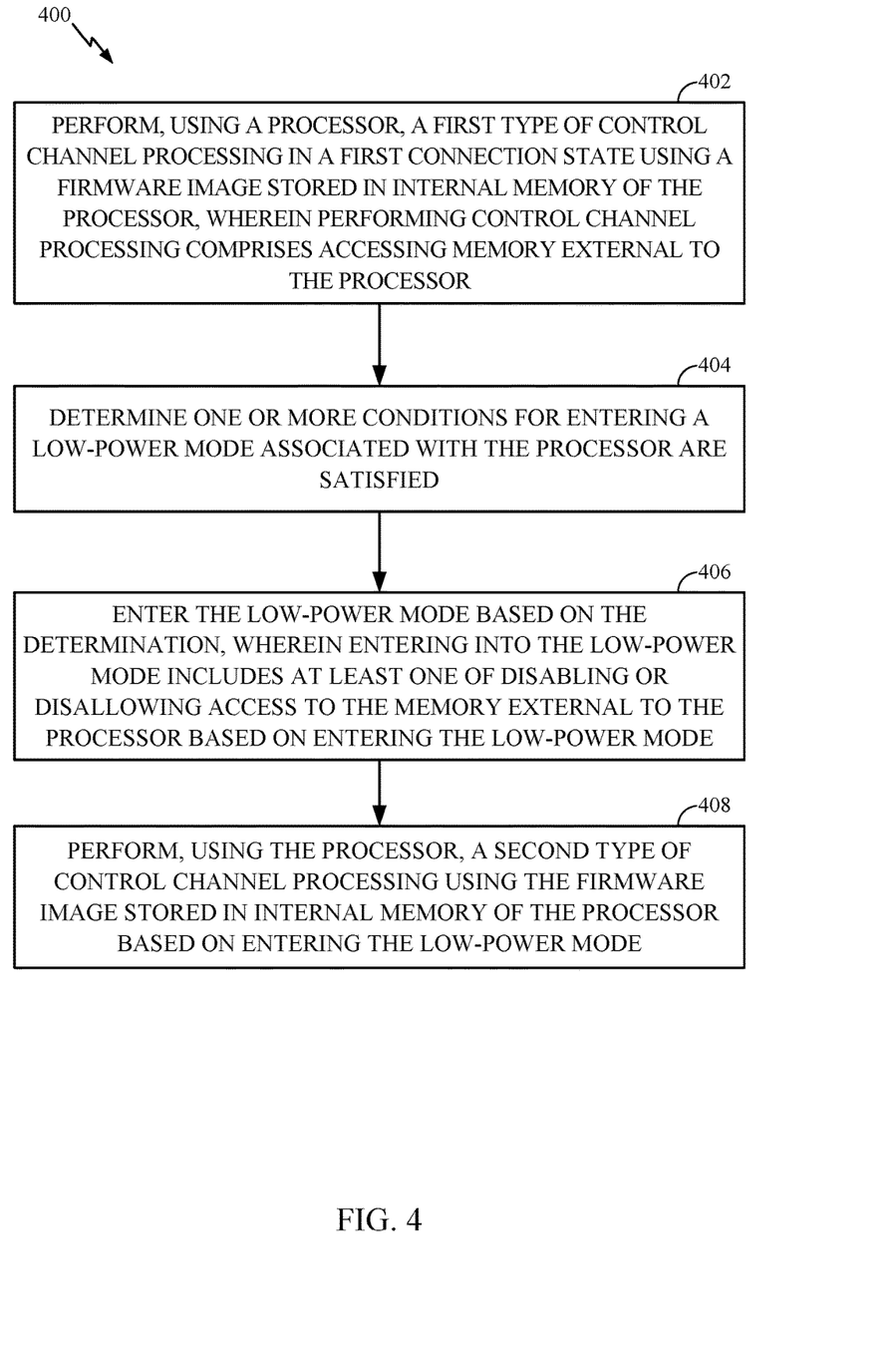
FIG. 4 illustrates example operations for wireless communications, in accordance with certain aspects of the present disclosure.

FIG. 4 illustrates example operations 400 for wireless communications, according to certain aspects. Operations 400 may be performed by a wireless communications device, such as a user equipment (UE) for reducing power consumption at the UE when the UE is in an idle mode or "PDCCH only" in connected mode.

Operations 400 begin at 402 by performing, using a processor, a first type of control channel processing in a first connection state using a firmware image stored in internal memory of the processor, wherein performing control channel processing comprises accessing memory external to the processor. According to aspects, the first connection state may comprise an idle state/mode or a "PDCCH only" in connected state/mode. At 404, the wireless communications device determines one or more conditions for entering a low-power mode associated with the processor are satisfied. At 406, the wireless communications device enters the low-power mode based on the determination, wherein entering into the low-power mode includes at least one of disabling or disallowing access to the memory external to the processor based on entering the low-power mode. At 408, the wireless communications device performs, using the processor, a second type of control channel processing using the firmware image stored in internal memory of the processor based on entering the low-power mode.

As noted above, power may be saved at the UE when performing control channel processing when the UE is in an idle mode and/or "PDCCH only" in connected mode by using the concept of a firmware island within the PHY FW domain on a DSP processor. In aspects, entering into the low-power mode further includes loading and locking at least one of code or data for control channel processing in internal memory of the processor. In aspects, disabling access to the memory external to the processor includes causing at least one of a memory controller to enter a low-power mode. In aspects, disallowing access to the memory external to the processor includes configuring a memory management entity to disallow access to the external memory. In aspects, the one or more conditions comprise at least one of not receiving a grant for resources for a threshold number of subframes or no search, measurement, or inter-Radio Access Technology (RAT) activity is expected for an upcoming number of subframes. In aspects, the method 400 further comprises placing the memory external to the at least one processor and any unused logic on the processor into a low-power self-refresh mode based on entering the low-power mode. In aspects, the method 400 further comprises suspending one or more tasks associated with the processor that are not associated with control channel processing. In aspects, the method 400 further comprises exiting the low-power mode based on at least one of receiving, by the UE, a grant for resources, receiving, by the UE, a page decode indication, a change in channel conditions that requires the UE to perform higher-layer radio link monitoring, a determination that a search, measurement, or another inter-Radio Access Technology (RAT) activity needs to be performed, or an interrupt indicating an unexpected request to access the memory external to the processor. In such aspects, exiting the low-power mode comprises removing the memory external to the processor from a low-power self-refresh mode, accessing the memory external to the at least one processor and performing the first type of control channel processing. In such aspects, accessing the memory external to the processor comprises updating one or more address translation buffer entries in a memory management entity to allow access to the memory external to the processor.

In aspects the second type of control channel processing comprises at least one of receiving and processing a physical control format indication channel (PCFICH), or monitoring a physical downlink control channel (PDCCH) for a grant for resources. In aspects, at least one of the memory external to the processor comprises double data rate (DDR) memory or the internal memory comprises tightly coupled memory (TCM), cache, or main memory. In aspects, the first connection state comprises an idle discontinuous reception (DRX) mode or a connected physical downlink control channel (PDCCH)-only mode. In aspects, disabling access to memory external to the processor comprises updating one or more address translation buffer entries in a memory management entity in the processor to disallow access to the memory external to the processor. In aspects, the processor is a modem processor.

Figure 5:
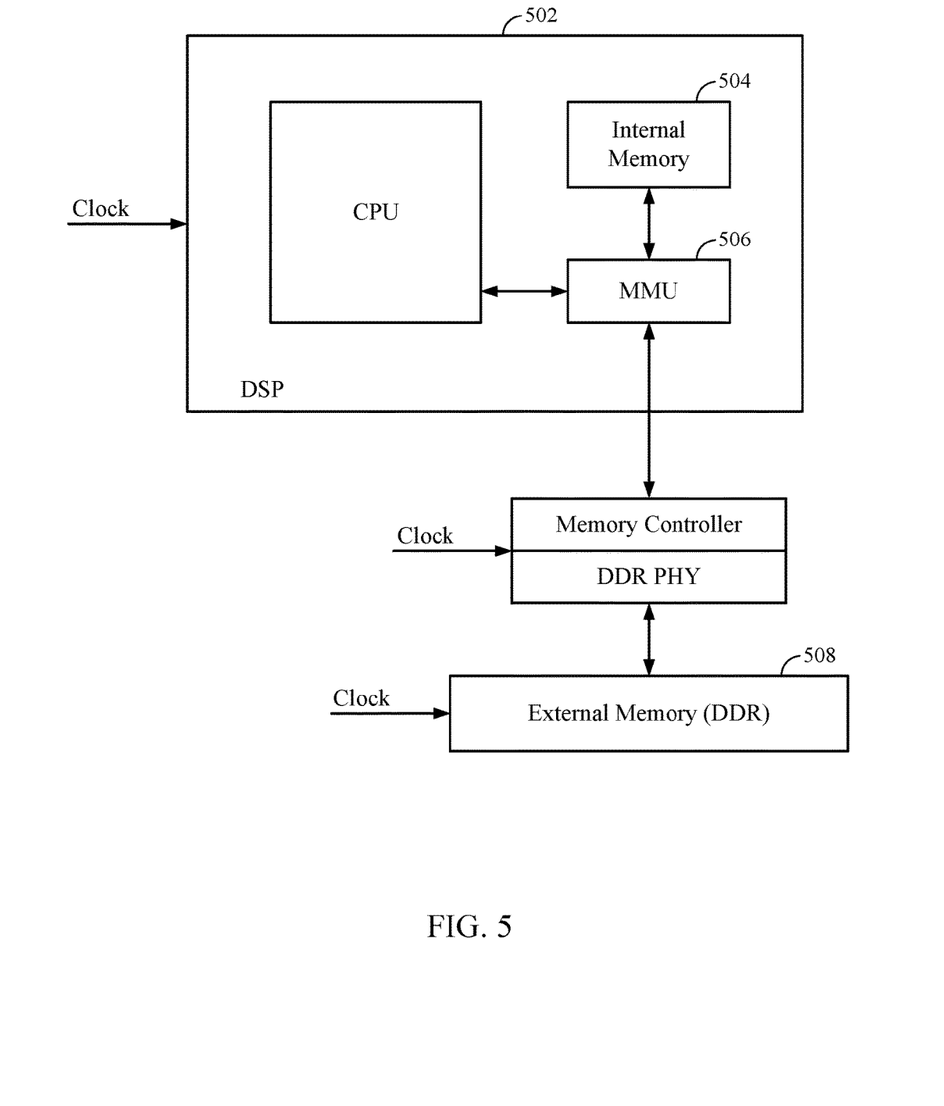
FIG. 5 illustrates an example digital signal processor, in accordance with certain aspects of the present disclosure.

FIG. 5 illustrates an example DSP 502 in which aspects of the present disclosure may be practiced. According to aspects, DSP 502 may comprise the DSP 320 of the wireless communications device 300 illustrated in FIG. 3.

According to aspects, DSP 502 may contain firmware stored on internal memory 504 (e.g., TCM, cache memory and/or main memory) that may be used to configure the DSP to perform different types of control channel processing.

For example, in some cases, the firmware may configure the DSP 502 to perform advanced control channel processing, which may require the use of external memory 508 (e.g., double data rate (DDR) memory). In other cases, the firmware may configure the DSP to enter a low-power mode and perform basic control channel processing. According to aspects, performing basic control channel processing may involve a limited number of less complex functions such as receiving and processing a physical control format indication channel (PCFICH) and/or monitoring a physical downlink control channel (PDCCH) for a grant for resources. In contrast, advanced control channel processing may involve receiving one of more downlink data channels, inter-RAT activities, channel measurements, etc.

According to certain aspects, the firmware may configure the DSP to enter a low-power mode and perform basic control channel processing based on one or more entry conditions. For example, these entry conditions may include at least one of not receiving a grant for resources over a threshold number of subframes or that no search, measurement, or inter-Radio Access Technology (RAT) activities are expected for an upcoming number of subframes. In other words, the UE may make a determination that a grant for resources has not been received in 'n' subframes and also determine that no search, measurement, or inter-RAT activities are expected for 'm' upcoming subframes. In this case, the firmware stored on the DSP may configure the DSP 502 to enter a low-power mode, which may involve loading and locking code and data necessary for the low-power mode into TCM, processor cache memory and/or processor main memory.

According to certain aspects, when operating in the low-power mode, access to external memory 508 may be restricted and the DSP may only rely on internal memory when performing basic control channel processing. For example, when one or more of the conditions for entering the low-power mode are satisfied, a memory management entity or memory management unit (MMU) 506 in the DSP 502 may be configured to restrict access to the external memory 508. For example, the MMU 506 may update one or more address translation buffer (e.g., translation-lookaside buffer (TLB)) entries to restrict access to memory addresses located in the external memory 508.

Additionally, according to certain aspects, external memory 508, as well as any unused logic (e.g., hardware gates) in the DSP 502, may be placed into a low-power self-refresh state, resulting in significant power-savings at the UE. In some cases, placing the external memory 508 into the low-power self-refresh state may involve reducing the clock signal supplied to the external memory 508 as illustrated in FIG. 5 and/or reducing a power supply voltage of the external memory 508.

Additionally, as part of entering the low-power mode, all tasks associated with the DSP 502 that are not required for control channel processing may be suspended and later resumed when exiting the low-power mode.

According to certain aspects, the DSP may exit the low-power mode based on one or more exit conditions. According to certain aspects, the one or more exit conditions may comprise at least one of receiving, by the UE, a grant for resources, receiving, by the UE, a page decode indication, a change in channel conditions that requires the UE to perform higher-layer radio link monitoring, a determination that a search, measurements, or other inter-Radio Access Technology (RAT) activities needs to be performed by the UE.

Additionally, in some cases, an exit condition may comprise receiving an internal interrupt indicating an unexpected request to access the memory external to the processor. For example, in some cases, the DSP 502 may unexpectedly be configured to try to access external memory 508 while in the low-power mode. In this case, an interrupt may be generated, which indicates such access attempt. Based on the generated interrupt, the DSP 502 may exit the low-power mode.

According to aspects, once the DSP 502 has exited the low-power mode, the wireless communications device may then perform any procedures needed to handle the exit condition. For example, if the DSP 502 exited the low-power mode because it was determined that higher-layer radio link monitoring needed to be performed by the UE, the wireless communications device may perform the higher-layer radio link monitoring.

According to certain aspects, as part of exiting the low-power mode, the wireless communications device may remove the external memory 508 from the low-power self-refresh mode and may increase the clock and/or voltage supplied to the external memory 508. Additionally, access to the external memory 508 may be restored and the wireless communications device may again perform more advanced control channel processing, for example, by loading the code and data necessary to perform the advanced control channel processing from internal memory 504. According to aspects, restoring access to external memory 508 may involve updating one or more address translation buffer entries (e.g., TLB entries) in the MMU 506 in the DSP 502 to allow access to memory addresses located in external memory 508.

According to certain aspects, the low-power mode may self-sufficiently maintain its own sub-frame timing and data structures with no top-level control. Additionally, in some cases, the low-power mode may not have access to existing LTE dynamic data blocks (DBs) and instead may have its own DB that gets initialized on entry to the low-power mode. According to certain aspects, any dynamic change to DB information may be disseminated to outer LTE DBs after exiting the low-power mode, which may enable the low-power mode to be used to save power in Multi-SIM scenarios as well. Additionally, the low-power mode may take advantage of simpler call flow and tighter constraints to execute in fewer cycles.

According to aspects, switching into/switching out of the low-power mode is handled fast in the same DSP processor as PHY firmware resides so that missing time between start/end of the low-power mode may be correctly handled by other modules. Additionally, the latency of switching out of the low-power mode is sufficiently fast to avoid timeline issues for scheduling synchronization channels (SCHs).

Aspects of the present disclosure propose techniques for saving power through the use of a FW-Island/low-power mode in a DSP. Alternatively, a hardware (HW) island (e.g., using two or more processors) could also be considered for achieving power savings; however it comes at the cost of additional silicon area. Therefore, creating an "island" within PHY FW domain on the DSP processor is more attractive from a power as well as silicon area perspective.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface (e.g., a first interface) to output a frame for transmission. For example, a processor may output a frame, via a bus interface, to an RF front end for transmission. Similarly, rather than actually receiving or obtaining a frame, a device may have an interface (e.g., a second interface) to obtain a frame received from another device. For example, a processor may obtain (or receive) a frame, via a bus interface, from an RF front end for transmission. The second interface may include, for example, any combination of a receiver, transceiver and/or scanning module, which may be configured to both (receive signals and) perform scanning operations and also receive information related to a channel scan performed by another device. In certain scenarios, the first and second interface may be the same interface.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for performing, means for determining, means for entering, means for disabling, means for performing, means for placing, means for suspending, means for exiting, means for removing, means for accessing, means for updating, and/or means for monitoring may include one or more processors, such as the processor 270 of the receiver system 250 illustrated in FIG. 2, the processor 304 of the wireless communications device 302, the DSP of the wireless communications device 203, and/or a DSP 502.

According to certain aspects, means may be implemented by processing systems configured to perform the corresponding functions by implementing various algorithms (e.g., in hardware or by executing software instructions) described above. For example, an algorithm for evaluating a condition of one or more channels available for use by other devices of a cluster and the apparatus, selecting one of the one or more channels as an operating channel for the cluster and the apparatus based, at least in part, on the evaluated condition, and outputting an indication of the selected operating channel for transmission to the cluster.

Additionally, an algorithm for causing a wireless communications device to switch into a low-power mode when performing control channel processing may be implemented by processing systems configured to perform the above functions.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of an access terminal 116 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Certain aspects may comprise a computer-readable medium having instructions stored (and/or encoded) thereon, the instructions being executable by one or more processors to perform the operations described herein. For example, the computer-readable medium may have instructions for evaluating a condition of one or more channels available for use by other devices of a cluster and the apparatus, selecting one of the one or more channels as an operating channel for the cluster and the apparatus based, at least in part, on the evaluated condition, and outputting an indication of the selected operating channel for transmission to the cluster. The computer-readable medium may have instructions for entering a low-power "island" mode associated with a processor, for example, as described above.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a user equipment (UE), comprising,
    performing, using a processor, a first type of control channel processing in a first connection state using a firmware image stored in internal memory of the processor, wherein performing control channel processing comprises accessing memory external to the processor;
    determining one or more conditions for entering a low-power mode associated with the processor are satisfied;
    entering the low-power mode based on the determination, wherein entering into the low-power mode includes at least one of disabling or disallowing access to the memory external to the processor based on entering the low-power mode; and
    performing, using the processor, a second type of control channel processing using the firmware image stored in internal memory of the processor based on entering the low-power mode.

2. The method of claim 1, wherein entering into the low-power mode further includes loading and locking at least one of code or data for control channel processing in internal memory of the processor.

3. The method of claim 1, wherein disabling access to the memory external to the processor includes causing a memory controller to enter a low-power mode.

4. The method of claim 1, wherein disallowing access to the memory external to the processor includes configuring a memory management entity to disallow access to the external memory.

5. The method of claim 1, wherein the one or more conditions comprise at least one of:
    not receiving a grant for resources for a threshold number of subframes; or
    no search, measurement, or inter-Radio Access Technology (RAT) activity is expected for an upcoming number of subframes.

6. The method of claim 1, further comprising placing the memory external to the at least one processor and any unused logic on the processor into a low-power self-refresh mode based on entering the low-power mode.

7. The method of claim 1, further comprising suspending one or more tasks associated with the processor that are not associated with control channel processing.

8. The method of claim 1, further comprising exiting the low-power mode based on at least one of:
    receiving, by the UE, a grant for resources;
    receiving, by the UE, a page decode indication;
    a change in channel conditions that requires the UE to perform higher-layer radio link monitoring;
    a determination that a search, measurement, or another inter-Radio Access Technology (RAT) activity needs to be performed; or
    an interrupt indicating an unexpected request to access the memory external to the processor.

9. The method of claim 8, wherein exiting the low-power mode comprises:
    removing the memory external to the processor from a low-power self-refresh mode;
    accessing the memory external to the at least one processor; and
    performing the first type of control channel processing.

10. The method of claim 9, wherein accessing the memory external to the processor comprises updating one or more address translation buffer entries in a memory management entity to allow access to the memory external to the processor.

11. The method of claim 1, wherein the second type of control channel processing comprises at least one of:
    receiving and processing a physical control format indication channel (PCFICH); or
    monitoring a physical downlink control channel (PDCCH) for a grant for resources.

12. The method of claim 1, wherein at least one of:
    the memory external to the processor comprises double data rate (DDR) memory; or
    the internal memory comprises tightly coupled memory (TCM), cache, or main memory.

13. The method of claim 1, wherein the first connection state comprises an idle discontinuous reception (DRX) mode or a connected physical downlink control channel (PDCCH)-only mode.

14. The method of claim 1, wherein disabling access to memory external to the processor comprises
    updating one or more address translation buffer entries in a memory management entity in the processor to disallow access to the memory external to the processor.

15. The method of claim 1, wherein the processor is a modem processor.

16. An apparatus for wireless communications performed by a user equipment (UE), comprising:
a processor configured to:
perform a first type of control channel processing in a first connection state using a firmware image stored in internal memory of the processor, wherein performing control channel processing comprises accessing memory external to the processor;
determine one or more conditions for entering a low-power mode associated with the processor are satisfied;
enter the low-power mode based on the determination, wherein entering into the low-power mode includes at least one of disabling or disallowing access to the memory external to the processor based on entering the low-power mode; and
perform a second type of control channel processing using the firmware image stored in internal memory of the processor based on entering the low-power mode.

17. The apparatus of claim 16, wherein the processor is configured to enter into the low-power mode by loading and locking at least one of code or data for control channel processing in internal memory of the processor.

18. The apparatus of claim 16, wherein the processor is configured to disable access to the memory external to the processor by causing a memory controller to enter a low-power mode.

19. The apparatus of claim 16, wherein the processor is configured to disallow access to the memory external to the processor by configuring a memory management entity to disallow access to the external memory.

20. The apparatus of claim 16, wherein the one or more conditions comprise at least one of:
not receiving a grant for resources for a threshold number of subframes; or
no search, measurement, or inter-Radio Access Technology (RAT) activity is expected for an upcoming number of subframes.

21. The apparatus of claim 16, wherein the processor is further configured to place the memory external to the at least one processor and any unused logic on the processor into a low-power self-refresh mode based on entering the low-power mode.

22. The apparatus of claim 16, wherein the processor is further configured to suspend one or more tasks associated with the processor that are not associated with control channel processing.

23. The apparatus of claim 16, wherein the processor is further configured to exit the low-power mode based on at least one of:
receiving, by the UE, a grant for resources;
receiving, by the UE, a page decode indication;
a change in channel conditions that requires the UE to perform higher-layer radio link monitoring;
a determination that a search, measurement, or another inter-Radio Access Technology (RAT) activity needs to be performed; or
an interrupt indicating an unexpected request to access the memory external to the processor.

24. The apparatus of claim 23, wherein when exiting the low-power mode the processor is further configured to:
remove the memory external to the processor from a low-power self-refresh mode;
access the memory external to the processor, wherein the processor is configured to access the memory external to the processor by updating one or more address translation buffer entries in a memory management entity to allow access to the memory external to the processor; and
perform the first type of control channel processing.

25. The apparatus of claim 16, wherein the processor is configured to is configured to perform the second type of control channel processing by at least one of:
receiving and processing a physical control format indication channel (PCFICH); or
monitoring a physical downlink control channel (PDCCH) for a grant for resources.

26. The apparatus of claim 16, wherein at least one of:
the memory external to the processor comprises double data rate (DDR) memory; or
the internal memory comprises tightly coupled memory (TCM), cache, or main memory.

27. The apparatus of claim 16, wherein the first connection state comprises an idle discontinuous reception (DRX) mode or a connected physical downlink control channel (PDCCH)-only mode.

28. The apparatus of claim 16, wherein the processor is configured to disable access to memory external to the processor by updating one or more address translation buffer entries in a memory management entity in the processor to disallow access to the memory external to the processor.

29. A non-transitory computer readable medium for wireless communications performed by a user equipment (UE), comprising instructions that when executed by a processor cause the processor to:
perform a first type of control channel processing in a first connection state using a firmware image stored in internal memory of the processor, wherein performing control channel processing comprises accessing memory external to the processor;
determine one or more conditions for entering a low-power mode associated with the processor are satisfied;
enter the low-power mode based on the determination, wherein entering into the low-power mode includes at least one of disabling or disallowing access to the memory external to the processor based on entering the low-power mode; and
perform a second type of control channel processing using the firmware image stored in internal memory of the processor based on entering the low-power mode.

30. An apparatus for wireless communications performed by a user equipment (UE), comprising,
means for performing a first type of control channel processing in a first connection state using a firmware image stored in internal memory, wherein the means for performing the first type of control channel processing are configured to access external memory during the first type of control channel processing;
means for determining one or more conditions for entering a low-power mode associated with the means for performing the first type of control channel processing are satisfied;
means for entering the low-power mode based on the determination, wherein the means for entering the low-power mode are configured to at least one of disable or disallow access to the external memory while in the low-power mode; and
means for performing a second type of control channel processing using the firmware image stored in the internal memory while in the low-power mode.

* * * * *